Sept. 12, 1939.  S. J. PAPP  2,172,622
TRANSMISSION MEANS FOR MOTOR VEHICLES
Filed June 13, 1938  6 Sheets-Sheet 1
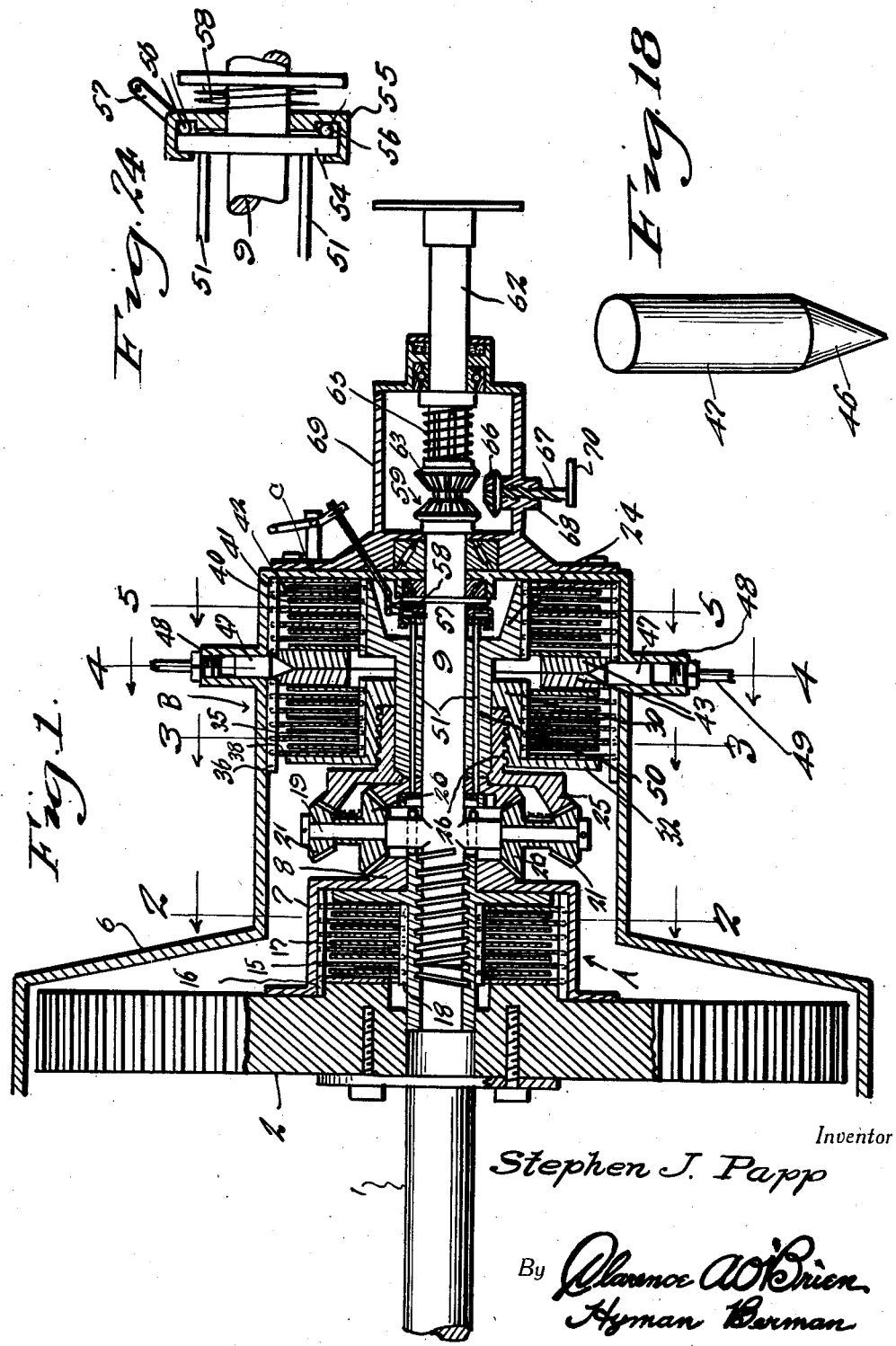
Inventor
Stephen J. Papp
By Clarence A. O'Brien
Hyman Berman
Attorneys Sept. 12, 1939. S. J. PAPP 2,172,622
TRANSMISSION MEANS FOR MOTOR VEHICLES
Filed June 13, 1938   6 Sheets-Sheet 2
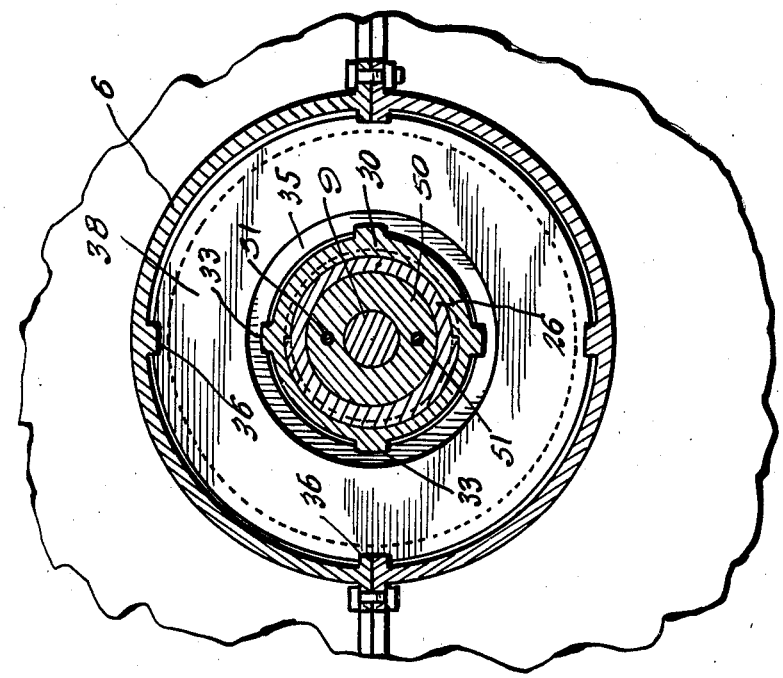
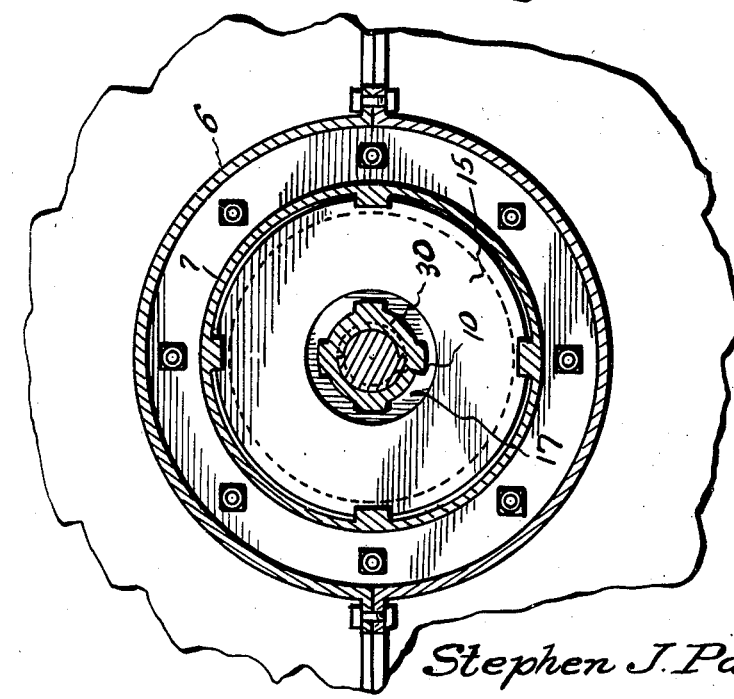
Inventor
Stephen J. Papp
By
Attorneys

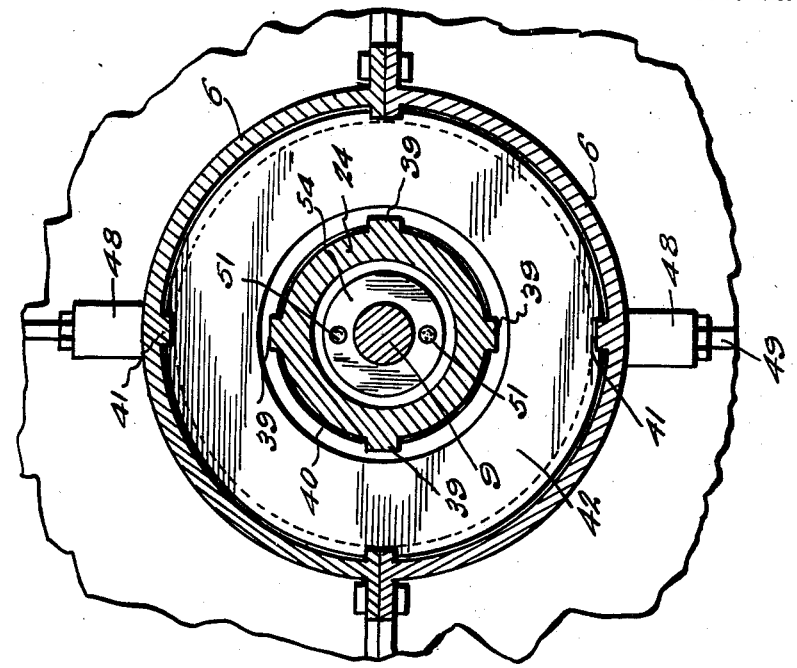
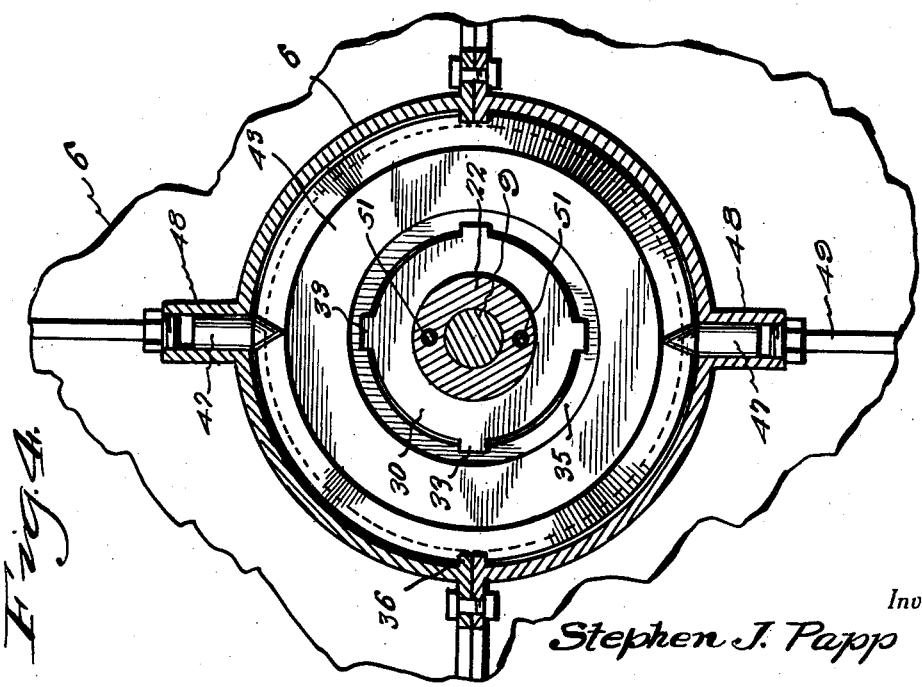

Sept. 12, 1939.   S. J. PAPP   2,172,622
TRANSMISSION MEANS FOR MOTOR VEHICLES
Filed June 13, 1938   6 Sheets-Sheet 4
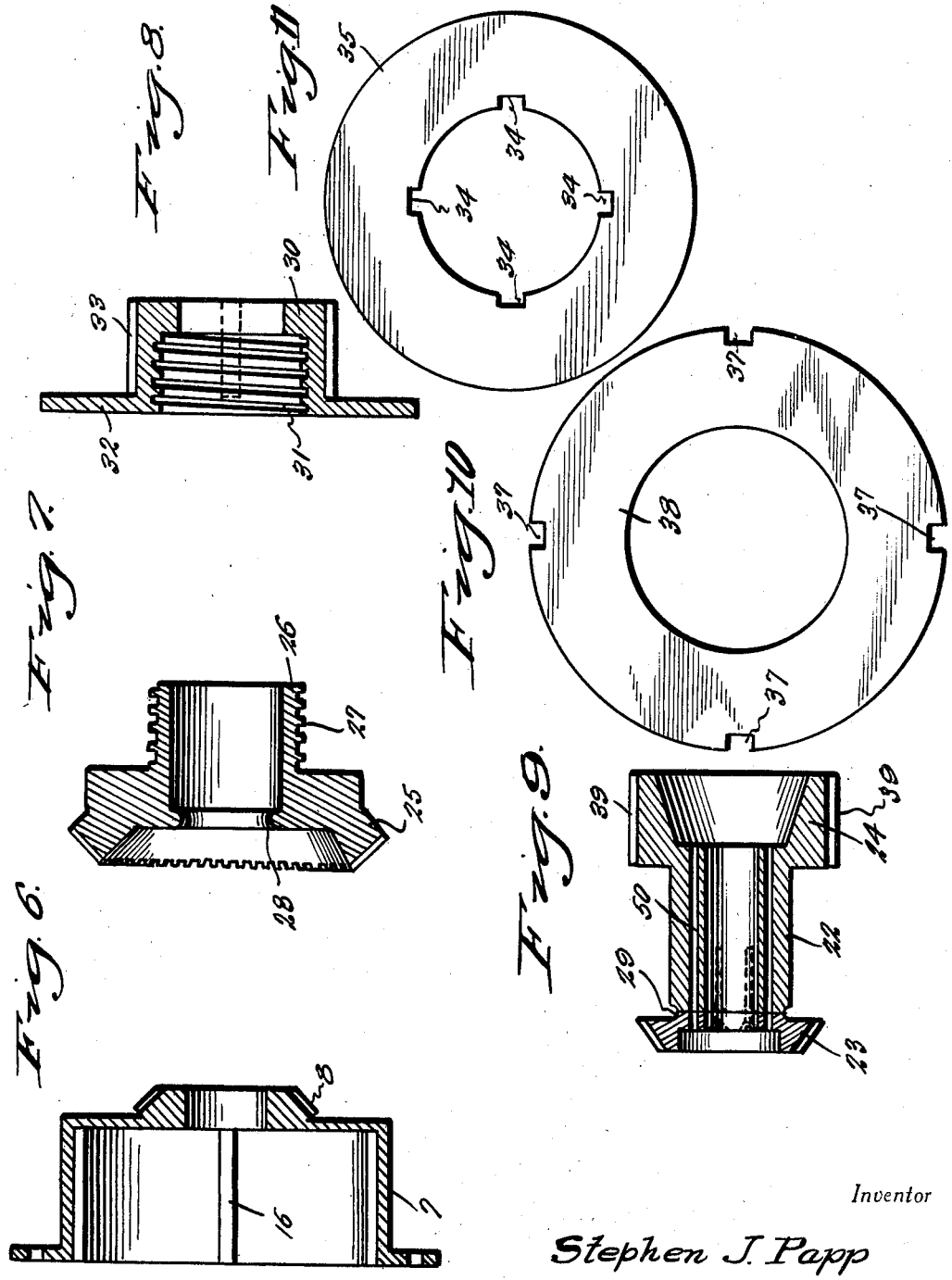
Inventor
Stephen J. Papp
By Clarence A. O'Brien
Hyman Berman
Attorneys Sept. 12, 1939.     S. J. PAPP     2,172,622
TRANSMISSION MEANS FOR MOTOR VEHICLES
Filed June 13, 1938     6 Sheets-Sheet 5
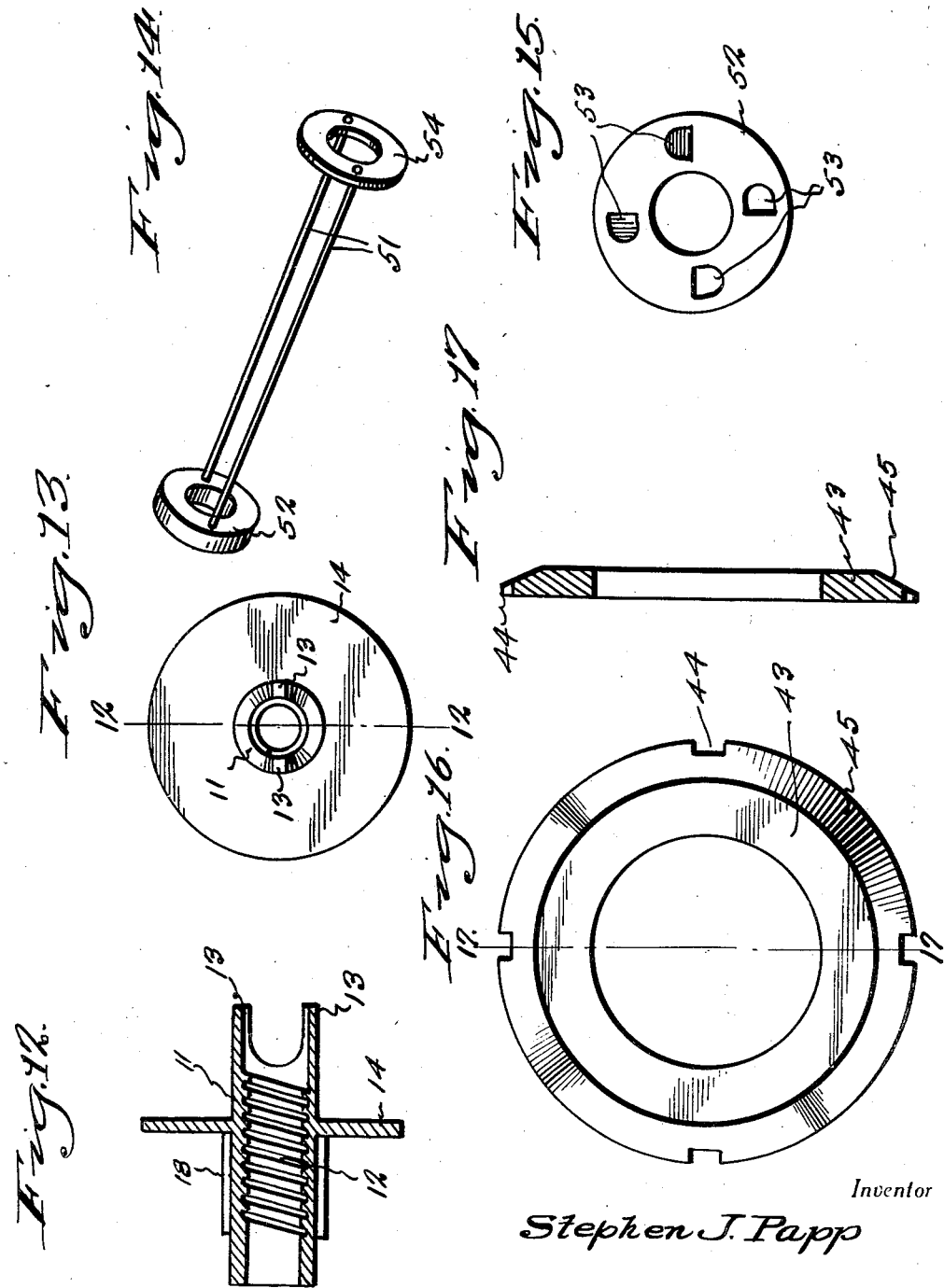
Inventor
Stephen J. Papp
By Clarence A O'Brien
Hyman Berman
Attorneys

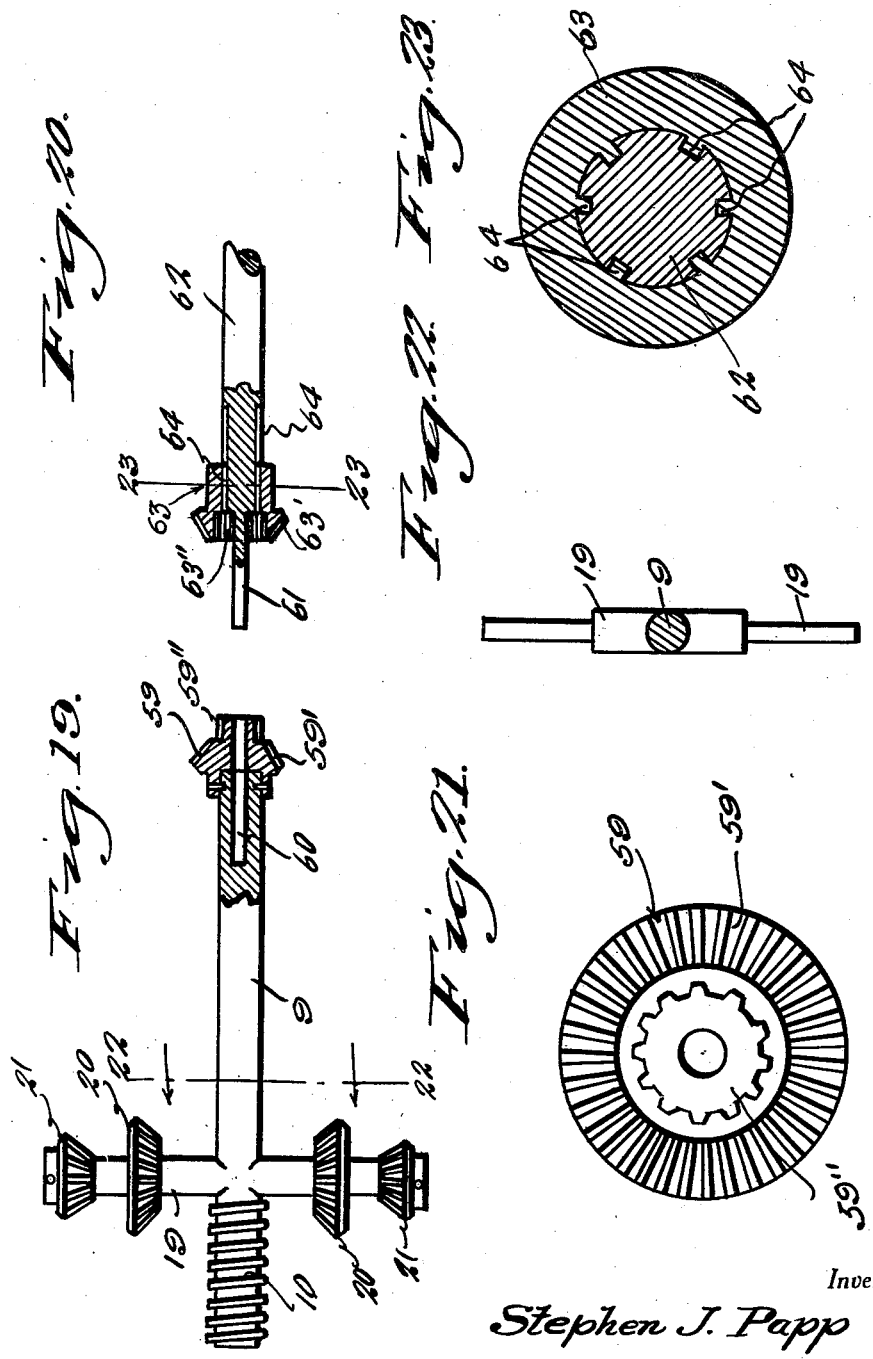

Patented Sept. 12, 1939

2,172,622

UNITED STATES PATENT OFFICE 2,172,622

TRANSMISSION MEANS FOR MOTOR VEHICLES

Stephen J. Papp, Buffalo, N. Y.

Application June 13, 1938, Serial No. 213,526

6 Claims. (Cl. 74—265)

This invention relates to transmission means for motor vehicles, the general object of the invention being to provide an efficient means for transmitting the motion of the engine to the wheel driving shaft and in such a manner that the usual clutch means are eliminated, and as the gearing is in constant mesh the invention eliminates shifting of the gears and gnashing of the gears as well as jerking of the vehicle when starting the same.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a longitudinal sectional view through the invention.

Figure 2 is a section on the line 2—2 of Figure 1.

Figure 3 is a section on the line 3—3 of Figure 1.

Figure 4 is a section on the line 4—4 of Figure 1.

Figure 5 is a section on the line 5—5 of Figure 1.

Figure 6 is a view of the clutch housing and gear carried by the flywheel, the parts being shown in section.

Figure 7 is a sectional view through the outer intermediate gear and its threaded shank.

Figure 8 is a view of the threaded brake member which is associated with the gear shown in Figure 7.

Figure 9 is a view of the inner gear on which the gear shown in Figure 7 rotates.

Figure 10 is a view of one of the outer brake plates.

Figure 11 is a view of one of the inner brake plates.

Figure 12 is a sectional view through the internally threaded tubular forked member which forms a part of the clutch means for connecting the driven shaft with the flywheel clutch member, the section being taken on the line 12—12 of Figure 13.

Figure 13 is a view looking toward the rear end of the member shown in Figure 12.

Figure 14 is a perspective view of the member for holding the member shown in Figure 12 in its forward position.

Figure 15 is a view of the front end of the member shown in Figure 14.

Figure 16 is a face view of one of the brake engaging plates carried by the transmission housing.

Figure 17 is a section on the line 17—17 of Figure 16.

Figure 18 is a view of one of the plungers for operating the pressure plates, one of which is shown in Figures 16 and 17.

Figure 19 is an elevation with parts in section of the transmission shaft.

Figure 20 is a view, partly in section, of the front end of the driven shaft and the gear thereon.

Figure 21 is a view looking toward the rear end of the gear at the rear end of Figure 19.

Figure 22 is a section on the line 22—22 of Figure 19 but showing the gears removed.

Figure 23 is a section on the line 23—23 of Figure 20.

Figure 24 is a detail view of the operating means of the member shown in Figure 14.

In these drawings the numeral 1 indicates the engine shaft to which the flywheel 2 is fastened and the numeral 6 indicates a part of the transmission housing. A clutch housing 7 is fastened to the rear face of the flywheel 2 and is formed with a beveled gear 8 on its rear end and the front end of the transmission shaft 9, shown in Figure 19, extends into the housing 7 and this front end is threaded as shown at 10. A tubular shaft 11 having internal threads 12 therein for engaging the threads 10 of the shaft 9 receives the said front end of the shaft 9 and passes through the housing 7 and through the center of the gear 8, the rear end of the tubular shaft being formed to provide the prongs 13. A plate 14 is formed with the shaft 11 and is located in the housing, at the rear end thereof. Clutch plates 15 are arranged in the housing and have notches in their outer peripheries for engaging the ribs 16 formed on the internal walls of the housing and other plates 17 are located in the housing between the plates 15 and have notches on their inner peripheries for engaging the ribs 18 formed on the shaft 11, shown more particularly in Figure 12. The transmission shaft 9 is formed with the oppositely arranged arms 19 which extend at right angles from the shaft, the outer portions of the arms being reduced to form bearings for the inner large gears 20 and the outer small gears 21, each pair of gears being connected together and each gear is of the beveled type, the large inner gears meshing with the gear 8. The inner ends of the arms pass through the spaces between the prongs 13.

The tubular shank 22 of a beveled gear 23 is rotatably arranged on the shaft 9 in rear of the arms, the gear 23 meshing with the inner large gears 20, the shank being formed with an enlarged hollow head 24 as shown more particularly in Figure 9. A tubular gear 25, see Figure 7, meshes with the small outer gears 21 and has its tubular shank 26 rotatably arranged on the shank 22, said shank 26 having the external threads 27 thereon and the gear 25 has a collar 28 which fits in an annular groove 29 at the junction of the gear 23 with its shank 22, the collar and groove acting to hold the gear parts 23 and 25 together, and said annular collar or rib 28 engaging the groove 29 permits rotary movement of the gear 25 on the shank 22 but prevents longitudinal movement of the parts. A brake member 30 is rotatably arranged on the shank 22 and has the internal threads 31 therein for engaging the threads 27 of the shank 26 and said brake member has the plate 32 at its front end. The member 30 is also provided with the ribs 33 for fitting in the notches 34 of the inner brake plates 35, one of which is shown in Figure 11 and ribs 36 are formed on the inner circumference of the transmission housing 6 for fitting in the notches 37 formed in the inner circumferences of the outer brake plates 38, one of which is shown in Figure 10. Ribs 39 are formed on the outer periphery of the head 24 of the shank 22 for fitting in notches formed in the inner brake plates 40 and ribs 41 are formed on the inner circumference of the rear part of the transmission housing 6 for fitting in notches formed in the outer brake plates 42 which extend between the plates 40. It will be seen from Figure 1 that the plates 35 and 38 form one set of brake plates and that the plates 40 and 42 form another set, the inner plates of the first set being slidably arranged on the member 30 and the inner plates of the second set being carried by the head 24, the outer plates of both sets being slidably arranged on ribs carried by the transmission housing 6. A pair of ring-shaped plates 43 is placed between two sets of brake plates, one of these plates 43 being shown in Figures 16 and 17 and each plate 43 is formed with the notches 44 in its outer circumference for engaging the ribs of the transmission housing and the outer portions of the adjacent faces of the two plates 43 are beveled as shown at 45 to receive the conical ends 46 of the hydraulic plungers 47, one of which is shown in Figure 18. These plungers are arranged in the small cylinders 48 extending from the rear portion of the transmission housing and fluid is adapted to be introduced into the cylinders in any suitable manner and from a suitable source of supply through the conduits 49. As will be understood when the fluid is introduced into the cylinders the plungers are forced inwardly so that their pointed or conical ends will press the plates 43 apart and thus apply pressure to the two sets of brake plates. The front outer plate 38 bears against the pressure plate 32 of the member 30 and the rear inner brake plate of the first set and the front inner brake plate of the second set are located adjacent the plates 43, as shown in Figure 1. It will be understood that all the brake plates are made similar to those shown in Figures 10 and 11. In order to permit the gear 25 and its shank 26 and the member 30 to be assembled on the shank 22 of the gear 23, said gear 23 is detachably connected to the shank 22, as shown in Figure 9. The shank 22 and gear 23 are formed with the longitudinally extending holes 50 through which slidingly pass the rods 51 and a ring-shaped member 52 is connected to the front ends of the rods and has a plurality of substantially semi-circular recesses 53 in its front face. A circular head 54 is connected with the rear ends of the rods as shown in Figures 14 and 15. As shown in Figure 15 the recesses or depressions 53 form a straight shoulder at the straight end of each recess and from this shoulder the bottom of the recess tapers outwardly to the rounded end of the recess or depression. A collar 55 surrounds the ring or member 54 and ball-bearings 56 are placed between the parts and a manually operated member 57 is connected with the collar 55 so that by operating the member 57 the member composed of the parts 51, 52 and 54 can be retracted rearwardly against the action of the spring 58 which tends to move the parts 51, 52 and 54 forwardly to place the depressions 53 in engagement with the prongs 13 of the member 11, the manually operated member holding the parts with the depressions out of engagement with the prongs 13.

A gear member 59 composed of a beveled gear 59' and a clutch member 59'', is connected to the rear end of the shaft 9 and a passage 60 passes through the gear member 59 into the rear end of the shaft 9 for receiving a reduced part 61 on the driven shaft 62 and the front end of the driven shaft 62 has a gear member 63 slidably arranged thereon, but held against relative rotation by means of the keys and keyways shown generally at 64. The gear member 63 is composed of a beveled gear 63' and an internal clutch member 63'', the internal clutch member receiving the clutch member 59'' when the transmission shaft 9 is connected with the driven shaft 62. A spring 65 holds the gear member 63 in its forward position with the clutch member 59'' fitting in the clutch member 63'', as shown in Figure 1. A beveled gear 66 is connected to the inner end of a spiral shaft 67 passing through a threaded boss 68 formed in the reverse gear housing 69 which is fastened to the rear end of the transmission housing 6. A manually controlled member 70 is connected to the outer end of the shaft 67 so that the shaft 67 can be rotated which will cause the spiral threads to cause the shaft to pass inwardly and thus place the gear 66 in engagement with the beveled gears 59' and 63' and this engagement of the parts will force the gear member 63 rearwardly on the shaft 62 so as to disengage the clutch member 59'' from the clutch member 63'' and then the shaft 62 will be driven from the shaft 9 by the gears 59', 66 and 63' which will reverse the movement of the shaft 62 so as to move the vehicle rearwardly. When the shaft 67 is turned in an opposite direction to disengage the gear 66 from the other gears the spring 65 will move the gear member 63 forwardly so that the clutch members 59'' and 63'' will intermesh and then the shaft 62 will be driven in the same direction as the shaft 9.

When the motor of the vehicle is first started all the clutch and brake means are in inoperative position and in order to make the description of the operation clearer the clutch means enclosed in the housing 7 will be referred to by the reference character A, the brake means carried by the member 30 will be referred to by the character B and the brake means at the rear of the transmission housing by the letter C.

Of course, before the motor is started the member 57 will be in a position holding the parts 51, 52 and 54 of Figure 14 in rearward position and the tubular shaft 11 will be in its rearward position, with the member 52 out of engagement with the prongs 13 of the tubular shaft 11. The rotation of the flywheel 2 will cause the housing 7 to rotate and rotary movement of the beveled gear 8 at the end of the housing 7 will rotate the pairs of gears 20 and 21. The threads 10 and 12 and the spaces between the prongs 13 of the shaft 11 must be so arranged that the arms 19 of shaft 9 will not interfere with the movement of the shaft 11 for the construction and expansion of the clutch part A.

Thus when the flywheel is rotating and all the clutch and brake parts are in released position the gear 8 will rotate the gears 20 and 21 so that the gears 23 and 25 will be rotated in an opposite direction from that in which the flywheel is rotating. The fluid is fed into the cylinders 48 to force the pistons or plungers 47 inwardly to press the plates 43 apart to cause the plates of the brakes B and C to engage. However, the plates of brake B are closer together than are the plates of brake C so that the brake B will stop movement of the gear 25 before the brake C stops movement of the gear 23. Thus when the gear 25 ceases to rotate the gears 21 will start to travel around the gear 25 so that the transmission shaft 9 is slowly rotated. Then brake C takes hold to stop movement of the gear 23, or practically so, and then the shaft 9 will rotate at such a speed that it will start to carry gear 25 with it and this will cause the threads 27 and 31 of the shank 26 and member 30 to move the member 30 forwardly so as to release the plates of brake B and this will permit the gear 25 to run free, even though the brake C is still holding gear 23. When the brake C stops gear 23 altogether the vehicle will be in intermediate speed. While this is taking place the tubular shaft 11 will naturally tend to drag along with the flywheel as up to this point the flywheel has been rotating much faster than the shaft 9. This causes the clutch A to remain in released position, due to the threads 12 of shaft 11 engaging the threads 10 of shaft 9. Then with the vehicle moving at intermediate speed pressure is removed from the cylinders so as to release the brakes B and C and the throttle of the engine is closed or partly closed so that the engine will slow down while the momentum of the vehicle will cause the driven shaft and shaft 9 to rotate faster than the engine. This will cause the threads of the tubular shaft 11 and shaft 9 to move the tubular shaft 11 forwardly so as to compress the plates of clutch A to connect the engine with the shaft 9 and thus the engine will rotate at practically the same speed as the driven shaft. This action is somewhat similar to a reversed free-wheeling. Then, if it is desired to put the vehicle into high speed, the member 57 is released so as to permit the spring 58 to move the member composed of the parts 51, 52 and 54 forwardly to engage the depressions 53 with the prongs 13 of the shaft 11. The throttle is then opened to speed up the engine and this will tend to cause gear 23 to rotate in a reverse direction from that of the engine and to carry the member composed of the parts 51, 52 and 54 with it. This causes the depressions of the head 52 to lock with the prongs 13 of the shaft 11 and due to the fact that the member 52 tends to move in a reverse direction, the clutch A is kept in operative position so that the vehicle is being driven at high speed from the engine and all of the gears moves a single unit.

When the throttle is closed to a stop or slow down, strain will be taken from the head 52 and prongs 13 so that the head 52 with the rod 51 and member 54 can be readily moved rearwardly by the manually operated member 57. The driven shaft will keep carrying the motor in a direct drive to reversed free-wheeling by means of the clutch A until the idling of the engine is faster than the speed of the driven shaft, at which time clutch A will automatically be disengaged, allowing the engine to idle. Then the vehicle can be stopped with its brakes. The motor cannot be disengaged from the driving wheels until the car is definitely under control.

It is thought from the foregoing description that the adavantages and novel features of the invention will be readily apparent.

It is to be understood that changes may be made in the construction and in the combination and arrangement of the several parts provided that such changes fall within the scope of the appended claims.

Having described the invention what is claimed as new is:

1. Transmission means of the class described including a drive member and a driven member, a housing into which said members extend, clutch means, means for automatically moving the clutch means to releasing position when the drive member is rotating faster than the driven member and for connecting the two members together by said clutch means when the driven member is moving faster than the drive member, manually operated means for moving the clutch means to operative position, a gear connected with the drive member, an arm on the driven member, gears rotatably arranged on the arm and one of which meshes with the first-mentioned gear, large and small gears meshing with the gears on the arm and rotatably arranged in the housing concentric to the driven member, brake means for each of the concentric gears and having parts engaging the housing, manually operated means for moving the brake means to operative position, one in advance of the other, and automatic means for releasing the brake means of one concentric gear when the speed of the driven member reaches a certain point.

2. Transmission means of the class described comprising a drive member and a driven member, a clutch housing connected with the drive member and having a gear thereon, a clutch member rotatably arranged in the housing and having a threaded connection with a part of the driven member, clutch means in the housing and moved to operative position when the driven member is moving faster than the drive member, manually operated means for moving the clutch means to operative position, an arm on the driven member, gears of different sizes rotatably arranged on the arm and one of which engages the first-mentioned gear, a casing into which the drive and driven members extend, a pair of gears concentrically arranged on the driven member and located in the housing, said gears meshing with the gears of the arm, brake means for each of the concentric gears and having portions engaging the last-mentioned housing, manually controlled means for moving the brake means for the concentric gears into operative position, one in advance of the other, automatic means for releasing one concentric gear from the advanced operated brake means when the speed of the driven member reaches a certain point.

3. Transmission means of the class described comprising a drive member, a driven shaft having a threaded portion adjacent the drive member, a tubular shaft fitting over the threaded portion and having internal threads engaging the first-mentioned threads, a clutch housing connected with the drive member, a gear carried by the housing, the tubular shaft extending into the housing, clutch means in the housing moved to operative position by a part on the tubular shaft, an arm on the shaft, beveled gears of different sizes rotatably arranged on the arm and one of which engages the gear of the housing, a small gear rotatably arranged on the driven shaft and meshing with the gear on the arm which meshes with the gear on the housing, a shank connected with the gear on the shaft, brake elements carried by the shank, a gear concentrically arranged on the shaft and meshing with the other gear of the arm, a brake member, brake elements carried thereby, a stationary member, two sets of brake elements carried thereby and engaging with the before-mentioned brake elements, a threaded connection between the concentric gear and the brake member, manually operated means for moving the brake elements of the two sets into operative position, said means moving the elements of the concentric gear into operative position before the other set of elements and spring actuated manually controlled means for holding the clutch means in operative position.

4. Transmission means of the class described comprising a drive member, a driven shaft having a threaded portion adjacent the drive member, a tubular shaft fitting over the threaded portion and having internal threads engaging the first-mentioned threads, a clutch housing connected with the drive member, a gear carried by the housing, the tubular shaft extending into the housing, clutch means in the housing moved to operative position by a part on the tubular shaft, an arm on the shaft, beveled gears of different sizes rotatably arranged on the arm and one of which engages the gear of the housing, a small gear rotatably arranged on the driven shaft and meshing with the gear on the arm which meshes with the gear on the housing, a shank connected with the gear on the shaft, brake elements carried by the shank, a gear concentrically arranged on the shaft and meshing with the other gear of the arm, a brake member, brake elements carried thereby, a stationary member, two sets of brake elements carried thereby and engaging with the before-mentioned brake elements, a threaded connection between the concentric gear and the brake member, manually operated means for moving the brake elements of the two sets into operative position, said means moving the elements of the concentric gear into operative position before the other set of elements and spring actuated manually controlled means for holding the clutch means in operative position, said means including members passing through the shank and gear on the driven shaft, means at the front end of said members for interlocking with the tubular shaft, when the parts are rotated in a certain direction, spring means for holding the parts in interlocking engagement and manually operated means for moving the members passing through said shank and gear rearwardly against the action of the spring and into inoperative position.

5. Transmission means of the class described comprising a drive shaft, a flywheel thereon, a transmission shaft, a housing enclosing the parts, the front end of the transmission shaft having threads thereon, a tubular shaft fitting over the front end of the transmission shaft and having internal threads therein engaging the first-mentioned threads, a clutch housing connected with a flywheel and through which the tubular shaft passes, a beveled gear on the rear end of the clutch housing and concentric to the tubular shaft, a compression plate connected with the tubular shaft and located in the rear end of the clutch housing, clutch plates in the housing, some of which are slidably connected with the tubular shaft and others of which are slidably connected with the housing, arms on the transmission shaft, inner and outer beveled gears connected together and rotatably arranged on each arm, the inner gear meshing with the gear of the clutch housing, a tubular shank surrounding the transmission shaft in rear of the arms, a gear connected to the front end of said shank, brake plates slidably carried by the rear end of the shank, brake plates slidably connected with the transmission housing and located between the brake plates just mentioned, the last-mentioned gear meshing with the inner gears on the arms, a second concentric gear meshing with the outer gears on the arms, a threaded shank for the second gear rotatably arranged on the first-mentioned shank, a brake member threaded to the threaded shank, brake plates slidably carried by the brake member, brake plates slidably carried by the transmission housing and located between the plates carried by the threaded shank, hydraulic means for moving the two sets of brake plates into operative position, said means moving the plates of the threaded brake member into position before the other set of plates, rods passing through the first-mentioned shank, a head on the front end of said rod having depressions therein, and the rear end of the tubular shaft having prongs for engaging the depressions, spring means for moving the rods forwardly, manually operated means for moving the rods rearwardly to disengage the head from the prongs.

6. Transmission means of the class described comprising a drive shaft, a flywheel thereon, a transmission shaft, a housing enclosing the parts, the front end of the transmission shaft having threads thereon, a tubular shaft fitting over the front end of the transmission shaft and having internal threads therein engaging the first-mentioned threads, a clutch housing connected with the flywheel and through which the tubular shaft passes, a beveled gear on the rear end of the clutch housing and concentric to the tubular shaft, a compression plate connected with the tubular shaft and located in the rear end of the clutch housing, clutch plates in the housing, some of which are slidably connected with the tubular shaft and others of which are slidably connected with the housing, arms on the transmission shaft, inner and outer beveled gears connected together and rotatably arranged on each arm, the inner gears meshing with the gear of the clutch housing, a tubular shank surrounding the transmission shaft in rear of the arms, a gear connected to the front end of said shank, brake plates slidably carried by the rear end of the shank, brake plates slidably connected with the transmission housing and located between the brake plates just mentioned, the last-mentioned gear meshing with the inner gears on the arms, a second concentric gear meshing with the outer gears on the arms, a threaded shank for the second gear rotatably arranged on the first-mentioned shank, a brake member threaded to the threaded shank, brake plates slidably carried by the brake member, brake plates slidably carried by the transmission housing and located between the plates carried by the threaded member, hydraulic means for moving the two sets of brake plates into operative position, said means moving the plates of the threaded brake member into position before the other set of plates, rods passing through the first-mentioned shank, a head on the front end of said rod having depressions therein, and the rear end of the tubular shaft having prongs for engaging the depressions, spring means for moving the rods forwardly, manually operated means for moving the rods rearwardly to disengage the head from the prongs, a driven shaft, interlocking gears for connecting the driven shaft with the transmission shaft, one gear being slidably arranged on the driven shaft, a longitudinally movable shaft, means for moving the shaft and a gear carried thereby for engaging the gears which connect the driven shaft with the transmission shaft, said gear moving the interlocking gears out of engagement with each other when it engages said interlocking gears.

STEPHEN J. PAPP.